(12) United States Patent
Rubin

(10) Patent No.: US 7,840,506 B1
(45) Date of Patent: Nov. 23, 2010

(54) SYSTEM AND METHOD FOR GEODESIC DATA MINING

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 575 days.

(21) Appl. No.: 11/971,393

(22) Filed: Jan. 9, 2008

(51) Int. Cl.
*G06F 15/18* (2006.01)

(52) U.S. Cl. .................. 706/14; 382/167; 342/118

(58) Field of Classification Search .......... 706/14; 382/167; 342/118
See application file for complete search history.

(56) References Cited

U.S. PATENT DOCUMENTS

| | | |
|---|---|---|
| 2004/0162638 A1 | 8/2004 | Solomon |
| 2005/0177593 A1 | 8/2005 | Solomon |
| 2005/0251291 A1 | 11/2005 | Solomon |
| 2006/0167917 A1 | 7/2006 | Solomon |
| 2008/0036646 A1* | 2/2008 | Green et al. ............ 342/118 |

* cited by examiner

*Primary Examiner*—Donald Sparks
*Assistant Examiner*—Kalpana Bharadwaj
(74) *Attorney, Agent, or Firm*—Ryan J. Friedl; Kyle Eppele

(57) ABSTRACT

In various embodiments, geodesic mining systems and methods are disclosed. For example, a method for forming and adapting a geodesic adaptive network may include embedding a set of rules into a two-dimensional adaptive network having N-rows and M-columns with rule independent variables embedded in a first column of the two-dimensional adaptive network and rule dependent variables embedded in the last column of the two-dimensional adaptive network, where N and M are positive integers greater than two, and repetitively selecting a pair of rows of the two-dimensional adaptive network having common dependent attributes using a random process, then adapting the two-dimensional adaptive network based on the selected pair of rows.

12 Claims, 3 Drawing Sheets

SYSTEM AND METHOD FOR GEODESIC DATA MINING

FEDERALLY-SPONSORED RESEARCH AND DEVELOPMENT

This present inventive subject matter (Navy Case No. 98330) was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil.

BACKGROUND

1. Field

This disclosure relates to systems and methods for data mining.

2. Background

Data mining may be thought of as a process for extracting data, including implicit and potentially useful information, from a variety of data sources, such as a set of large but disparate databases. Generally, data mining involves reviewing large amounts of data, and subsequently picking that information which appears relevant and potentially valuable.

Initially, data mining was used primarily by business-related organizations and by financial analysts. However, the benefits of data mining have spurred its adoption in the various non-financial sciences as well.

Artificial Neural Networks (ANNs) have increasingly come to the aid of data mining applications. For example, a software application known as the Alyuda Forecaster by Ayluda Research Corporation® of Los Altos, Calif., has developed a trainable neural network that can work with Excel® Spreadsheets by Microsoft Corporation® of Redmond, Wash.

Despite the progress of ANN-enhanced data mining systems, known ANNs suffer from a number of deficiencies. For example, known ANNs cannot perform the logical "modus ponens" operation, and thus it follows that ANNs may be unsuited for certain data mining operations. Accordingly, new data mining technologies are desirable.

SUMMARY

Various aspects and embodiments of the invention are described in further detail below.

In a first series of embodiments, a method for forming and adapting a geodesic adaptive network includes embedding a set of rules into a two-dimensional adaptive network having N-rows and M-columns with rule independent variables embedded in a first column of the two-dimensional adaptive network and rule dependent variables embedded in a last column of the two-dimensional adaptive network, where N and M are positive integers greater than 2, and repetitively selecting a pair of rows of the two-dimensional adaptive network having common dependent attributes using a random process, then adapting the two-dimensional adaptive network based on the selected pair of rows.

In another series of embodiments, a computer-readable memory containing instructions such that, when accessed by a computing system, enables the computing system to create a geodesic network. The memory includes a set of first instructions for embedding a set of rules into a two-dimensional adaptive network having N-rows and M-columns with rule independent variables embedded in a first column of the two-dimensional adaptive network and rule dependent variables embedded in a last column of the two-dimensional adaptive network, where N and M are positive integers greater than 2, and a set of second instructions for repetitively selecting pairs of rows of the two-dimensional adaptive network having common dependent variables using a random process, then adapting the two-dimensional adaptive network based on the selected pairs of rows.

In yet another series of embodiments, an apparatus for forming and adapting a geodesic network includes a network device containing a two-dimensional adaptive network having N-rows and M-columns, the two-dimensional adaptive network configured to contain a set of rules with rule independent variables embedded in a first column of the two-dimensional adaptive network and rule dependent variables embedded in a last column of the two-dimensional adaptive network, where N and M are positive integers greater than 2, a selection device configured to repetitively select pairs of rows of the two-dimensional adaptive network having common dependent variables using a random process and a network adaptation device configured to adapt the two-dimensional adaptive network based on the selected pairs of rows.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

The term, "geodesic mining" may be thought of as synonymous with iterative randomization. In other words, the minimal space-time randomization can be shown to require, in general, that any knowledge mined at time t be dependent on the knowledge mined at time t−1 (i.e., curve the space of attainable randomizations), which is unlike existing mining methodologies (e.g., artificial neural networks (ANNs)), that embody a fixed, immutable external algorithm, i.e., a linear space of attainable randomizations.

Figure 1:
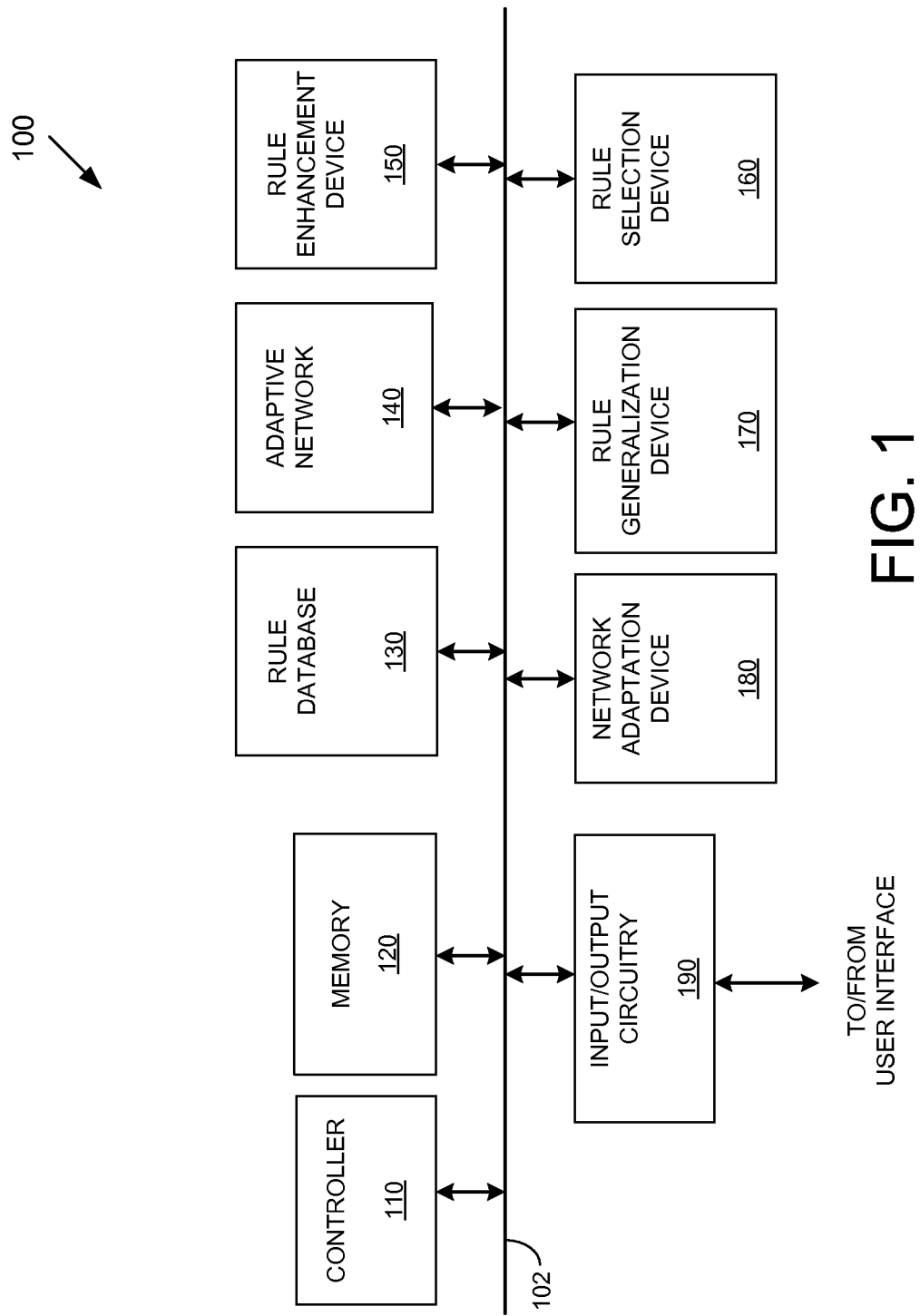
FIG. 1 depicts an exemplary geodesic system.

FIG. 1 depicts an exemplary data mining system 100. As shown in FIG. 1, the exemplary data mining system 100 includes a controller 110, a memory 120, a rule database 130, an adaptive network 140, a rule enhancement device 150, a rule selection device 160, a rule generalization device 170, a network adaptation device 180 and input/output circuitry 190. The above-components 110-190 are coupled together using control/data bus 102.

Although the exemplary data mining system 100 of FIG. 1 uses a bussed architecture, it should be appreciated that any other architecture may be used as is well known to those of ordinary skill in the art. For example, in various embodiments, the various components 110-190 can take the form of separate electronic components coupled together via a series of separate busses.

Still further, in other embodiments, one or more of the various components 110-190 can take form of separate processing systems coupled together via one or more networks. Additionally, it should be appreciated that each of components 110-190 advantageously can be realized using multiple computing devices employed in a cooperative fashion.

It also should be appreciated that some of the above-listed components 130-180 can take the form of software/firmware routines residing in memory 120 and be capable of being executed by the controller 110, or even software/firmware routines residing in separate memories in separate computing systems being executed by different controllers.

In operation, the data mining system 100 may need to establish a set of rules for the rule database 130. Typically, such rules may be provided from any number of human and computer sources. Additionally, such rules may be directed to a particular endeavor of human understanding, such as medical diagnostics and loan processing.

After the rule database 130 is established, the rules may be embedded into the adaptive network 140, which for the present embodiment includes a two-dimensional adaptive construct. Unlike a neural network, such as the Alyuda Forecaster, which requires that the initial number of rows must be at least ten times the total number of columns (or a warning message will be issued) geodesic miners are not so constrained. Rather, geodesic miners may perform best if the number of occurrences of the dependent variables is much greater than the number of values for the dependent variable.

Figure 2:
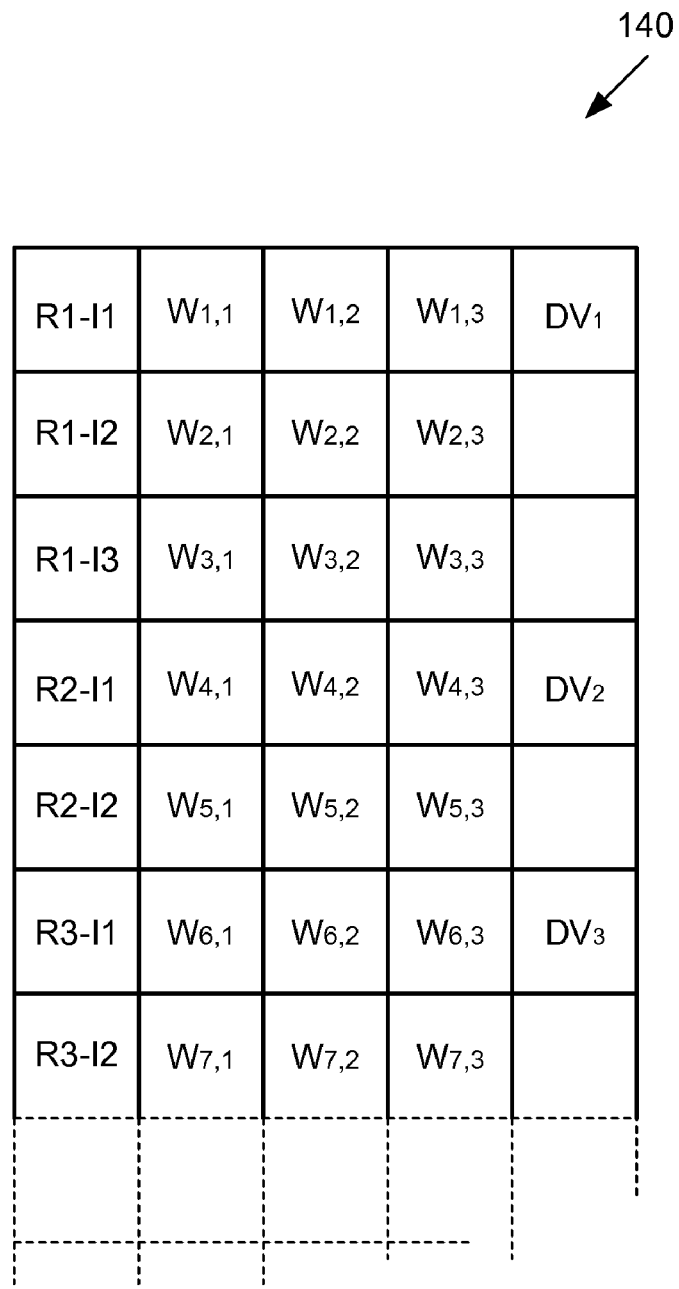
FIG. 2 depicts an exemplary two-dimensional adaptive network.

FIG. 2 depicts an exemplary two-dimensional adaptive network 140 having five columns and N-number of rows. The independent variables (i.e., the antecedents) of the various rules R1-I1 . . . R3-I2 can be placed in the left-most column while the dependent variables $DV_1$, $DV_2$, $DV_{13}$ . . . (i.e., the consequents) of the various rules R1-I1 . . . R3-I2 can be placed in the left-most column. Intermittent columns 2-4 may be populated with processing individual cells $W_{i,j}$ each of which may represent a function (e.g., a sum of products) of all of the individual cells in the column to the immediate left while noting that the dependent variables $DV_1$, $DV_2$, $DV_{13}$ may be functions of the individual cells $W_{1,3}$ . . . $W_{N,3}$ in the column to their immediate left.

Returning to FIG. 1, in various embodiments the rule enhancement device 150 may operate on the embedded rules. Note that the rule enhancement device 150 may make enhancements to rules before or after such rules are embedded into an adaptive network.

The initial adaptive network may be deterministic in the independent variables and have no null independent cells. However, if non-deterministic rules or null independent cells are present, they may be identified to be corrected or deleted. Thus, the rule enhancement device 150 may operate to remove or correct non-determinism.

Further, rows containing only null dependent variable cells may be precluded from training the associated rule base, and thus the rule enhancement device 150 may fill in such dependent cells, or possibly enable a user to do the same. Note that any supplied values for the independent variables that do not cover at least one rule antecedent in the base (e.g., by being "out of range" for at least one independent variable for its tier) may produce predictions that are "UNKNOWN" in the dependent value. Given sufficient training time, this may be the only route to obtaining an UNKNOWN prediction for the respective dependent values.

In various embodiments, the rule enhancement device 150 may create generalized rules (based on existing rules) with each generalized rule capable of being embedded into the two-dimensional adaptive network. Note that each column of the two-dimensional adaptive network may be of type set or of type set of real intervals (e.g., {Cold Day, Hot, Warm Weather}, or {[−1.2, 0], [2.71, 3.14], . . . }). For example, [0, 2]−[2, 2]=[0, 2)~[0, 1.99999999], depending on machine precision. Also, {[−1, 1], [2, 3]}∪[1, 2]} becomes {[−1, 3]}. Moreover, {[−2, 2]}−{[−1, 1]}={[−2, −1), (1, 2]}.

When enhancing say, an exemplary set [1, 3] [4] [5, 6], it can be advantageous to not over-generalize to form [1, 6]. Rather, it may be advantageous to generalize the exemplary set with the nearest among the two (or more) centroids, 2 and 5.5, which is [5, 6] in this example and will yield [1, 3] [4, 6]. Ties may be resolved arbitrarily.

New rows, whether to accommodate generalized rules or otherwise, may be batched and appended at the bottom of the adaptive network.

After the adaptive network as been appropriately enhanced (if necessary), the rule selection device 160 may randomly select rows in the adaptive network until a distinct pair of rows, Ri, Rk, having a common dependent attribute (i.e., a value in a dependent variable) is identified. For the present embodiment, a hash categorizer for each value of the dependent variable that includes a pointer to the associated row can be used, while initializing an associated counter and pointer to zero. Whenever a distinct row is selected by chance, the counter is incremented, then the associated pointer is set (i.e., if appropriate). As soon as a counter value becomes two, a pair of rules may follow, and the associated counter and pointer may be reset to zero. Note that parallel processing is facilitated by not requiring visited rows to be tracked. Not only does random row selection make for an interruptible algorithm; but, it also serves to eliminate generalization bias caused by hill-climbing by for example reusing one rule of the pair without random selection.

Also, forcing row visitation does not respect attribute frequency. That is, dependent as well as independent variables can be randomly selected with frequency that is proportionate to their (desired) frequency of occurrence in the base. Thus, generalizations are properly made along contours that bear proportion to the iterative frequency of the associated independent cell values in each column for each value of the dependent variable. That is why its predictions will, on average, be more accurate than non geodesic miners (e.g., neural networks).

A good scheme (i.e., the 3-2-1 skew) for selecting rows (not columns) based on their (logical) position in the insert-at-the-tail (pointer) list using an application domain base of r rows is to assign the last row a probability P1 of being selected described by Eq. (1) below:

$$P1 = \frac{2r}{r(r+1)}. \quad \text{Eq. (1)}$$

The next to the last row has a probability P2 of being selected according to Eq. (2) below:

$$P2 = \frac{2(r-1)}{r(r+1)}. \quad \text{Eq. (2)}$$

Finally, the first row of the rule base has a probability P3 of being selected according to Eq. (3) below:

$$P3 = \frac{2}{r(r+1)}. \qquad \text{Eq. (3)}$$

A highly efficient algorithm for realizing the 3-2-1 skew follows. In accordance with Amarel's 1968 Machine Intelligence paper, this algorithm (or something equivalently efficient) could not be found by trying to solve the above equations, but only through a change of representation of the given problem. Notice that the algorithm uses an initial skew to accelerate the results obtained during a short run-time, while longer run-times are better served by the uniform random search. Moreover, since search time grows as the square of the application rule base size and the number of processors is necessarily linear, it follows that the system will not have sufficient time to perform pure uniform search with scale (see below). Note that an interpretation of the 3-2-1 skew can be used to statistically limit the number of rules to comb for contradiction—to enable a speedup at the cost of consistency with historical data (rules); but, this will not be implemented here.

The 3-2-1 skew algorithm has the added advantage of favoring the bottom rows of the rule base during short run-times. Often, a point will be reached whereupon it is impractical to follow the skew to its conclusion with scale. Should the skew naturally conclude in the small, then the algorithm runs in uniform search mode so as not to waste CPU cycles. A uniform search mode may be advantageous here because it can search beyond the immediate past, which has been practically covered. It follows that "large" sheets can at best be relatively randomized in practice and termination only occurs upon interrupt. For the pseudo-code below, the inner "j2" loop is used because the number of independent variables is independent of the number of rows and this allows enough time to statistically generalize each column (i.e., it is twice exactly enough if they are visited sequentially, which gives the best space-time coverage when visited in uniform random order).

Start 3-2-1 Skew Here: /* r is the current number of rows in the base. */ Starting with row r, in the rule base, work upwards until the number of occurrences of any value of the dependent variable is two (i.e., using the above "hash categorizer"). At this point, take i to be the row, where this condition is first satisfied.
Write to GUI, "In 3-2-1 skew mode";
Repeat/*3-2-1 skew mode */
For j1=i to r
For j2=1 to (2*Number_Independent_Variables)
Select a pair of rows using a uniform random number generator (Mersenne Twister) with numbers in [i, r];
i←i−1
Until (i=1) or Interrupt;
/* If i=1 and not interrupt, continue to run in uniform mode: */
Start_Uniform_Mode_Here:
Write to GUI, "In uniform mode";
Repeat/*uniform mode*/
Select a pair of rows using a uniform random number generator (Mersenne Twister) with numbers in [1, r]
Until Interrupt.

Note that for the above pseudo-code as well as other approaches, the use of the Mersenne Twister algorithm for the generation of all random numbers provides superior performance.

Further, a GUI checkbox to a prospective user may be used to determine whether rows of an adaptive network are to be selected using uniform chance (e.g., good for small datasets or where the rows are not time ordered), or through the "initial" use of a 3-2-1 skew (e.g., good for large data sets, where the higher the row number the more recent the data, or by default). Columns may be always selected using uniform chance.

During operation, randomly select an independent column, j, to be used in conjunction with the previously selected rule pair, Ri, Rk, from the same "tier." Sorting the data into tiers by dependent attribute could result in as much as a 25 percent speedup in theory and substantially less in practice. This result assumes a worst case analysis using two values for the dependent variable and an early rejection bias due to contradiction. Sorting by tiers may not be more efficient for large sheets having numerous dependent values that are run on parallel processors—in part because there may be no advantage to having processors sit idle. Thus, while any program implementing the disclosed methods and systems should not be designed to sort the data into dependent tiers, it might advantageously be designed so as to be so modifiable. Moreover, this allows any statistical bias in generalization (discussed further below) to become relatively less prevalent with larger rule bases.

As each pair of rules is selected, the network adaptation device 180 may perform the appropriate adaptation processes on the adaptive network. As the underlying adaptation algorithms may vary widely from embodiment to embodiment, details considering particular embodiments will be omitted noting that such adaptation technology may take any number of forms, such as heuristic, neural based, based on statistical relevance and combinations thereof.

Continuing, the rule generalization device 170 may create generalized rules. During generalization, it may be useful to sequentially create the following test sequence defined by the following two numerical steps. Ri is taken as the most recent, or highest numbered (i.e., bottom-most) rule of the pairing.

a. If (Ri,j≠Ri,j∪Rk,j), form a temporary Ri,j=Rk,j−Ri,j.
b. If necessary, compare Ri∪Ri,j from (a) above sequentially (in parallel) against all rows in the rule base that have different values for the dependent variable (as before).
c. If a contradiction is found, then Ri←Ri—the contradicting member(s) of Ri,j. Here, Ri,j←Ri,j−Rk,j, where Rk,j properly belongs to the row generating a contradiction.
d. If Ri,j={ } as a result, then immediately return with failure on this generalization attempt. If Ri∪Ri,j from (a) above is free of contradiction in the rule base, then Ri←Ri∪Ri,j.
e. Rule instances may be embedded in multiple rows all having the same value for the dependent variable. One rule does not necessarily subsume the other here. The advantage of this compact, or random representation, over generating individual rules that could be hashed is that exponentially fewer rows need be generated (reducing spatial requirements to a tractable size) and that such multiple embeddings may be addressed by parallel processors. If m new distinct set values each are taken in union with n independent columns, then the upper bound on the number of new rows otherwise needed to hold these embedded rules is $m^n$.
f. Again, let, Ri and Rk represent the selected rule pair. If each independent column in Ri is a subset (i.e., including equivalence) of the corresponding column in Rk, then expunge the instance (oldest one, if equivalent), Ri, save its generalization, Rk, and efficiently coalesce the rule space (and vice versa for Rk and Ri). Coalescing marks blank rows to avoid visiting them and removes them upon conclusion. The test to see if one rule of the pair subsumes the other is not conditional upon a generalization having been made. This follows because previously generalized rules may be found to subsume another here and be removed to facilitate subsequent generalizations (i.e., natural cleansing)—especially on a massively parallel processor.

During rule generalization, it may be advantageous to display the elapsed time since the last successful rule generalization via input/output circuitry and a user screen with a GUI (not shown). Time measures may be used here instead of iterations when parallel processors are employed as this metric display may better enable the user to decide when to interrupt. The design again allows for massive parallel processing, where contention on the data bus is checked for and locked out, where appropriate. Do not write to the display too often, lest the algorithm be slowed unnecessarily.

Figure 3:
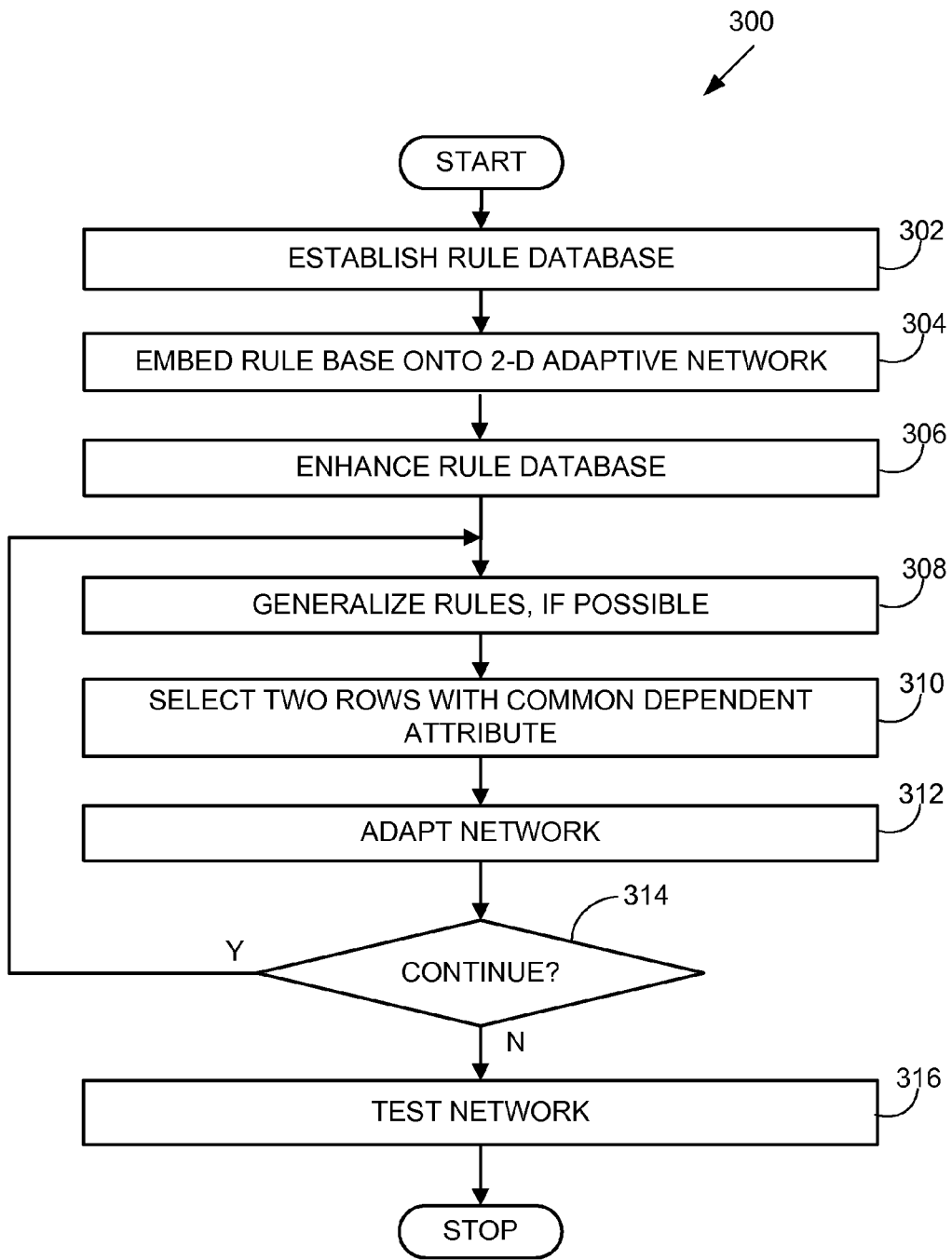
FIG. 3 is a flowchart outlining a number of exemplary operations of the disclosed methods and systems.

FIG. 3 shows a flowchart outlining a number of exemplary operations of an embodiment of a geodesic mining method 300. Method 300 may begin at step 302, where a set of rules may be established. Generally, such rules may be provided from one or more people knowledgeable in the art, from previously established sets of rules or combinations thereof. However, the particular method of establishing a set of rules may vary from embodiment to embodiment.

Next, at step 304, the set of rules may be embedded into an adaptive network, such as the two-dimensional adaptive network depicted in FIG. 2. Then, at step 306, the embedded rules may be enhanced according to any of the techniques discussed above to remove non-deterministic rules, remove conflicting rules, remove null independent variables and generalize rules. Method 300 may then proceed to step 308.

At step 308, a generalizing operation may be optionally performed on the embedded rules whereby new generalized rules may be produced and added to the adaptive network. Next, at step 310, two or more rows of the adaptive network may be randomly selected based on attributes of dependent variables. Step 312 may follow step 310. At step 312 the adaptive network may undergo an adaptation process based on the selected rows of step 310. The network may be adapted to evolve co-dependent feature sets. Although causality cannot be known for certain, better sets of features can be found on a relative basis for explaining the independent variables from the dependent variables. This process may be computationally intense, thus necessitating adaptive methods of discovery. Network adaptation may serve to better conceptualize causality. For example, literature is replete with examples of data mining algorithms that "overfit" the data. This means that while their features quite adequately explain the trained in-sample data, they do not explain well the out-of-sample test data because the algorithms have not properly conceptualized causality.

The network may adapt to the data through the use of multiple runs. Those runs that better explain the out-of-sample data are presumed to have better evolved the underpinning model using in-sample data. The in-sample training makes unique use of a "well" phenomenon. Here, solutions not falling into these wells can be identified and removed—much as implausible roots of equations can be identified and discarded in other engineering work. The well phenomenon is based on iterative convergence of parametric solutions. More often than not, different random seeds induce different stable (fixed-point) well configurations. These configurations are cleaned of implausible solutions and compared on the out-of-sample data on successive runs (e.g., an average of about ten runs has been used, which can be run entirely in parallel on ten processors).

Step 314 may follow step 312. At step 314, a determination is made as to whether to continue to process the adaptive network. If processing is to continue, control jumps back to step 308; otherwise, method 300 continues to step 316. Generally, it should be appreciated that the underlying determination process at step 314 may take any number of forms, i.e., may be random, may be based on a predetermined number, may be based on the existing or desired number of rules. At step 316 the geodesic network may be tested for performance. Step 316 may utilize various testing measures as recognized by one having ordinary skill in the art.

In various embodiments where the above-described systems and/or methods are implemented using a programmable device, such as a computer-based system or programmable logic, it should be appreciated that the above-described systems and methods can be implemented using any of various known or later developed programming languages, such as "C", "C++", "FORTRAN", Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-readable memory containing instructions such that, when accessed by a computing system, enables the computing system to create a geodesic network, the memory comprising:

a set of first instructions for embedding a set of rules into a two-dimensional geodesic adaptive network having N-rows and M-columns with rule independent variables embedded in a first column of the two-dimensional geodesic adaptive network and rule dependent variables embedded in a last column of the two-dimensional geodesic adaptive network, where N and M are positive integers greater than 2; and a set of second instructions for repetitively selecting pairs of rows of the two dimensional geodesic adaptive network having common dependent variables using a random process, then adapting the two-dimensional geodesic adaptive network based on the selected pairs of rows.

2. The computer-readable memory of claim 1, further comprising a set of third instructions for periodically creating and adding one or more generalized rules to the two-dimensional adaptive network during the steps of repetitively selecting and adapting.

3. The computer-readable memory of claim 1, further comprising a set of third instructions for enhancing the set of rules.

4. An apparatus for forming and adapting a geodesic network, comprising:

a network device containing a two-dimensional geodesic adaptive network having N-rows and M-columns, the two-dimensional geodesic adaptive network configured to contain a set of rules with rule independent variables embedded in a first column of the two dimensional geodesic adaptive network and rule dependent variables embedded in a last column of the two-dimensional geodesic adaptive network, where N and M are positive integers greater than two;

a selection device configured to repetitively select pairs of rows of the two-dimensional geodesic adaptive network having common dependent variables using a random process; and a network adaptation device configured to adapt the two-dimensional geodesic adaptive network based on the selected pairs of rows.

5. The apparatus of claim 4, further comprising an enhancement device configured to enhance the embedded set of rules.

6. The apparatus of claim 5, wherein the enhancement device is configured to perform at least one of removing non-deterministic rules, removing conflicting rules, removing null independent variables from rules and creating generalized rules.

7. The apparatus of claim 6, further comprising a generalizing device configured to periodically add one or more generalized rules to the two-dimensional adaptive network, the generalized rules derived from the embedded rules.

8. The apparatus of claim 4, further comprising a generalizing device configured to periodically add one or more generalized rules to the two-dimensional adaptive network, the generalized rules derived from the embedded rules.

9. The apparatus of claim 4, wherein the random process is based on the Mersenne Twister algorithm.

10. A system comprising:

a controller operatively connected to a data bus;

an adaptive network operatively connected to the data bus, the geodesic adaptive network having N-rows and M-columns with rule independent variables embedded in a first column of the two-dimensional geodesic adaptive network and rule dependent variables embedded in a last column of the two-dimensional geodesic adaptive network, where N and M are positive integers greater than two;

a rules database operatively connected to the data bus, the rules database having at least one set of rules stored therein;

a rule selection device operatively connected to the data bus;

a network adaptation device operatively connected to the data bus; and a memory module operatively connected to the data bus, the memory module having a set of first instructions and a set of second instructions stored therein, the set of first instructions for selected a set of rules from the rules database using the rule selection device and embedding the selected set of rules into the geodesic adaptive network, the set of second instructions for repetitively selecting pairs of rows of the adaptive network having common dependent variables using a random process, then adapting the geodesic adaptive network using the network adaptation device based on the selected pairs of rows.

11. The system of claim 10 further comprising a rule enhancement device operatively connected to the data bus.

12. The system of claim 10 further comprising a rule generalization device operatively connected to the data bus.

\* \* \* \* \*